United States Patent
Schupp et al.

(10) Patent No.: US 8,438,057 B2
(45) Date of Patent: May 7, 2013

(54) UNIFIED ONSCREEN ADVERTISEMENT SYSTEM FOR CE DEVICES

(75) Inventors: William Arthur Schupp, San Diego, CA (US); Nicole Rebong, Cardiff-by-the-Sea, CA (US); Ludovic Etienne Douillet, Escondido, CA (US); Klaus Hofrichter, San Diego, CA (US); Aran London Sadja, San Diego, CA (US); Philip Carl Miller, Encinitas, CA (US)

(73) Assignee: Sony Corporation, Tokyo (JP)

( * ) Notice: Subject to any disclaimer, the term of this patent is extended or adjusted under 35 U.S.C. 154(b) by 184 days.

(21) Appl. No.: 13/073,146

(22) Filed: Mar. 28, 2011

(65) Prior Publication Data

US 2012/0116877 A1    May 10, 2012

Related U.S. Application Data

(60) Provisional application No. 61/411,601, filed on Nov. 9, 2010.

(51) Int. Cl.
*G06Q 30/00*    (2006.01)

(52) U.S. Cl.
USPC ............... 705/14.1; 705/14.49; 705/14.64

(58) Field of Classification Search .................. None
See application file for complete search history.

(56) References Cited

U.S. PATENT DOCUMENTS

| | | | |
|---|---|---|---|
| 2002/0087978 A1* | 7/2002 | Nicholson et al. | 725/34 |
| 2007/0088801 A1* | 4/2007 | Levkovitz et al. | 709/217 |
| 2009/0165054 A1* | 6/2009 | Rudolph | 725/46 |
| 2010/0080202 A1* | 4/2010 | Hanson | 370/338 |

* cited by examiner

*Primary Examiner* — Namrata (Pinky) Boveja
*Assistant Examiner* — Thuy N Nguyen
(74) *Attorney, Agent, or Firm* — John L. Rogitz

(57) ABSTRACT

A client-server architecture allows consumer electronics (CE) devices to obtain advertisements, including TV and network content recommendations, via a unified application programming interface (API). A gateway server between online advertisement providers and CE devices prioritizes and personalizes the advertisements and recommendations for a requesting CE device. This architecture scales over time and evolves more functionality without requiring CE device software updates.

19 Claims, 2 Drawing Sheets

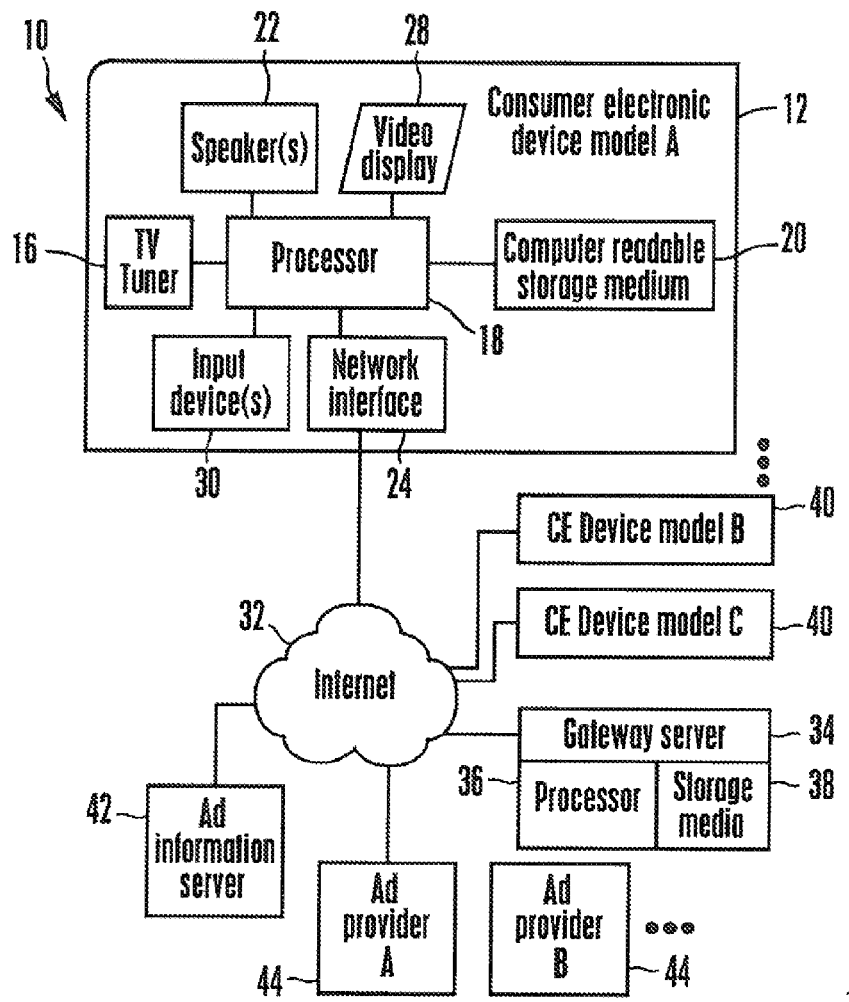
Figure 1
Figure 2
initial logic
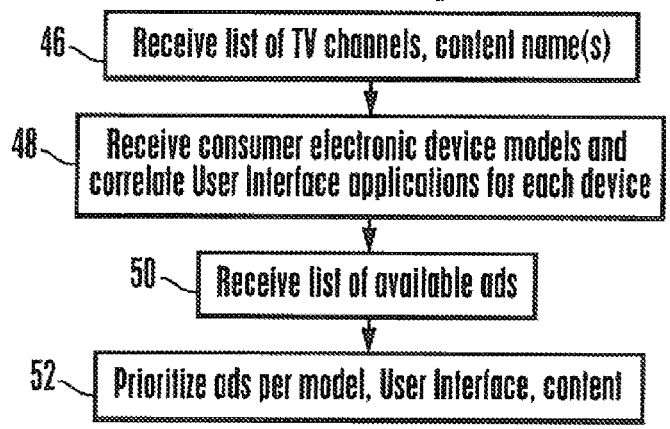

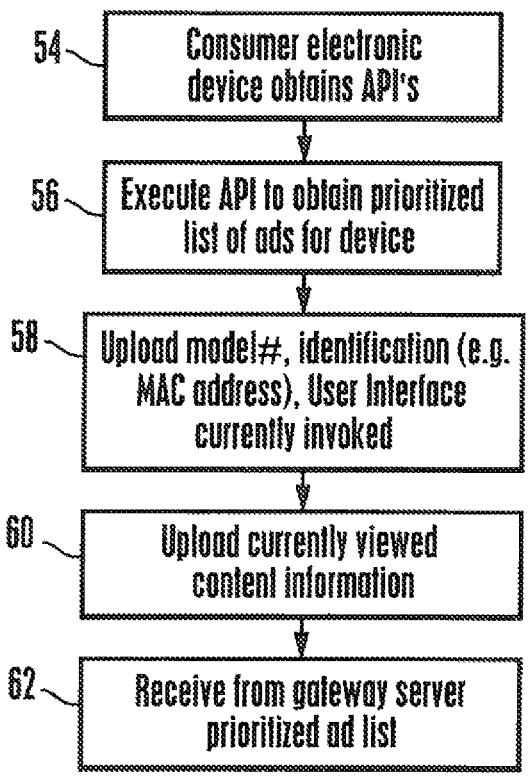
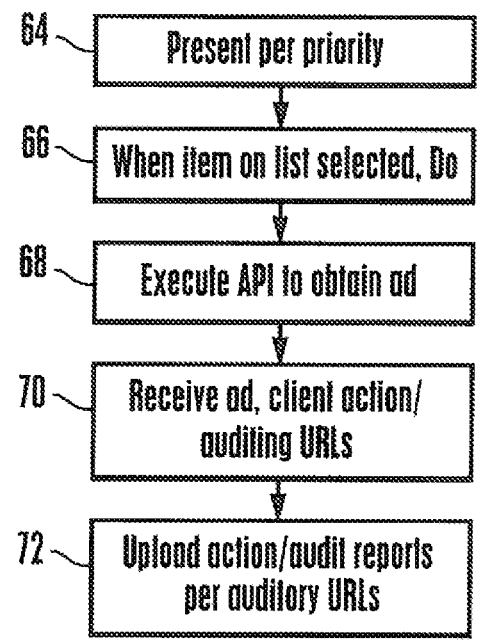
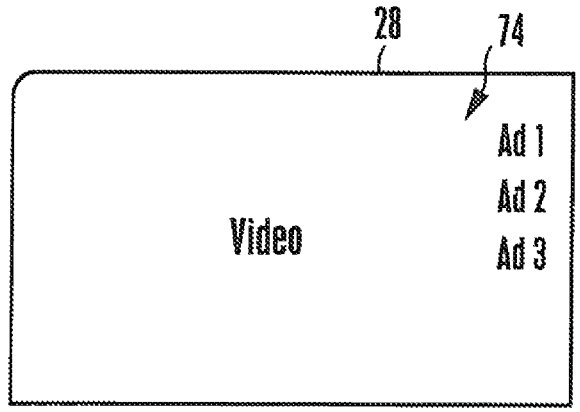

UNIFIED ONSCREEN ADVERTISEMENT SYSTEM FOR CE DEVICES

This application claims priority to U.S. provisional patent application Ser. No. 61/411,601, filed Nov. 9, 2010.

FIELD OF THE INVENTION

The present application relates generally to unified onscreen advertisement systems for consumer electronics (CE) devices.

BACKGROUND OF THE INVENTION

With more and more CE devices connecting to the Internet, the opportunities for downstream revenue from advertising embedded within the digital content and on-screen applications are increasing dramatically. Note that "advertisement" includes sales advertisements for new products and services as well as notifications that items such as purchasable software updates are available.

As understood herein, however, current advertising systems limit the opportunities to increase downstream revenue for the manufacturers of CE devices. This is because advertisers typically contract with Internet advertising agencies to develop advertisements that are provisioned through channels that do not include the manufacturers of the CE devices. While limited revenue may be realized by, e.g., populating advertising campaigns into electronic program guides (EPGs) embedded in some TV models, obstacles remain to expanding advertising revenue to CE device manufacturers beyond the current EPG paradigm. As understood herein a standard network application programming interface (API) for retrieving advertisements for CE devices does not exist, and the use of proprietary APIs will not generate the scale necessary to attract premium advertisers. Additionally, supporting multiple CE platforms complicates negotiation and development with other business entities.

As understood herein, a simple unified advertisement provisioning and delivery service for CE devices may be implemented using a managed server, referred to herein from time to time as a "Ad Management" server, which acts as a gateway between the ad providers and the CE devices, prioritizing and personalizing the advertisements and recommendations for the requesting CE device. Advertisement provisioning and retrieval may be accomplished via two ad service application specific interfaces (APIs), referred to below in an example implementation as GetAdList( ) and GetAd( ).

SUMMARY OF THE INVENTION

According to principles set forth further below, a simple unified advertisement provisioning and delivery service for CE devices may be implemented using a managed server, referred to herein from time to time as an "Ad Management" server, which acts as a gateway between the ad providers and the CE devices, prioritizing and personalizing the advertisements and recommendations for the requesting CE device. Advertisement provisioning may retrieval is accomplished via two ad service application specific interfaces (APIs), referred to below in an example implementation as GetAdList( ) and GetAd( ).

Accordingly, a consumer electronics (CE) device includes a processor and a computer readable storage medium bearing instructions executable by the processor to send a model number of the CE device to a gateway server. The processor receives from the gateway server a list of advertisements which can include actual advertisement content or point the CE device to one or more advertisers to retrieve ads dynamically. The list indicates an order of the advertisements for display, and the order is based on the model number of the CE device. The processor then presents the list on the CE device according to the order.

If desired, the processor can send to the gateway server an identification of a user interface (UI) currently invoked by the processor, and the order may be further based on the identification of the UI. Also, the processor may send to the gateway server an identification of a TV channel currently being displayed by the CE device, and the order can be further based on the identification of the TV channel. Similarly, the processor may send to the gateway server a title of an audio video content currently being displayed by the CE device, with the order being further based on the title of the audio video content.

In example implementations the processor further sends an address of the CE device to the gateway server to obtain the list. If desired, the processor, responsive to a user of the CE device selecting an item from the list, may execute an application programming interface (API) to obtain a full ad corresponding to the selected item. The full ad can be received by the CE device along with client action/auditing URLs which upload subsequent user actions on the CE device as audit reports to the URLs.

In another aspect, a method includes receiving first and second model information of respective first and second consumer electronics (CE) devices. The first CE device is not the same model as the second CE device. The method includes associating a first list of advertisements (ads) with the first model information, with the first list of ads having a first order among the ads on the first list, and associating a second list of ads with the second model information. The second list of ads has a second order among the ads on the second list. The first and second priorities are different from each other.

In another aspect, a server has a processor and a computer readable storage medium bearing instructions executable by the processor to receive from a consumer electronics (CE) at least a model number of the CE device. Using the model number, the processor arranges advertisements (ads) in an order that is based on the model number and sends the ads in the order to the CE device for presentation thereof by the CE device.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting example system in accordance with present principles;

FIGS. 2-4 are flow charts of example logic in accordance with present principles; and FIG. 5 is a screen shot of an example prioritized list of ads.

DETAILED DESCRIPTION OF THE PREFERRED EMBODIMENT

Referring initially to the non-limiting example embodiment shown in FIG. 1, a system 10 includes a consumer electronics (CE) device 12 such as a portable TV including a TV tuner 16 communicating with one or more processors 18 accessing one or more tangible computer readable storage media 20 such as disk-based or solid state storage bearing logic and data in accordance with present principles. The CE device 12 can output audio on one or more speakers 22. The CE device 12 can receive streaming video from the Internet using a network interface 24 such as a wired or wireless modem communicating with the processor 12 which may execute a software-implemented browser stored on the medium 20. Video may be presented under control of the processor 18 on a video display 28. User commands to the processor 18 may be received from an input device 30 such as but not limited to wired or wireless keyboards, keypads, touch sensor array under the display 28, mice, or other pointing and clicking device such as a wireless TV remote control, etc. CE devices other than a TV may be used, e.g., smart phones, game consoles, personal digital organizers, notebook computers and other types of computers, etc.

As shown in FIG. 1, the CE device 12 can communicate through the Internet 32 or other wide area network with a gateway server 34 having one or more processors 36 accessing one or more computer readable storage media 38 bearing logic and data in accordance with present principles. Other CE devices 40 likewise can communicate with the gateway server 34 through the Internet. The various CE devices 12, 40 shown in FIG. 1 may be different models of CE device made by the same manufacturer, so that, for example, the CE device 12 may be a TV, one of the CE devices 40 may be a wireless telephone, another may be a personal digital assistant, and so on, each model having its own purpose and processing and display capabilities different from other models.

FIG. 1 also shows that an ad info server 42 may communicate with the Internet for purposes to be shortly disclosed, as well as server 44 from various ad providers and storing the content of Internet advertisements.

Now referring to FIG. 2, which depicts logic used to populate the gateway server 34 with prioritized ad lists, at block 48 a list of potential TV channels and content titles may be received. Also, at block 48 the model numbers of the various CE devices for which it is intended to use prioritized ad provisioning are received along with, for each device, its various user interfaces (UI) it may display. In one example, a manufacturer of a line of CE devices including TVs, cell phones, PDAs, computers, and the like may provide all the available model numbers in the line of CE devices and their corresponding UIs.

Proceeding to block 50, a list of Internet ads and their addresses at which they may be accessed that the manufacturer of the CE devices whose model numbers were provided at block 48 is received. Then, at block 52, in accordance with priority rules developed in concert between the CE device manufacturer and various ad-related entities, the ads received at block 50 are arranged into multiple associations according to the priority rules based on the CE device type, UI, and in some embodiments content-related information received at block 46. These lists of associations are stored at the gateway server 34.

To exemplify, a particular model of CE device, say, model A TV, may be associated with a list of advertisements that are to be presented on the CE device in accordance with further disclosure below in the following order: Ad 1, then Ad 2, then Ad 3, then Ad 4. If desired, this list may be further refined depending on the particular UIs the CE device has available as indicated at block 48. For example, when UI #10 is being displayed on the CE device, the ad list may be truncated to only the top two in the order, whereas when UI #20 is being displayed on the CE device, all four ads in the list may be displayed. This is but an example, in other embodiments the lists may present different ads altogether depending, e.g., on the different UIs of the different devices, not that one is truncated from the other.

As intimated above, the prioritized list may further vary with content title/TV channel. For example, when TV channel 2 is being presented in a video window of the display 28 the order of the above priority (from 1 to 2 to 3 to 4) may change to Ad 1, Ad 3, Ad 2, Ad 4. The same UI-based modifications may still apply, e.g., when UI #10 is being displayed on the CE device, the ad list may be truncated to only the top two in the order, whereas when UI #20 is being displayed on the CE device, all four ads in the list may be displayed.

Next suppose that a particular model of CE device, say, model B PDA, is identified at block 48. This model B device may be associated with a list of advertisements that are to be presented on the CE device in accordance with further disclosure below in the following order: Ad 2, then Ad 5, then Ad 8, then Ad 14, with Ad 2 being the same Ad 2 as above but with the other Ads being different Ads as indicated by their different numbers. If desired, this list may be further refined depending on the particular UIs the CE device has available as indicated at block 48. For example, when UI #10 is being displayed on the CE device, the ad list may be truncated to only the top three in the priority, whereas when UI #20 is being displayed on the CE device, all four ads in the list may be displayed.

As intimated above, the prioritized list may further vary with content title/TV channel. For example, when movie title A is being presented in a video window of the display of the PDA the order of the above order may change in accordance with principles above. The same UI-based modifications may still apply, e.g., when UI #10 is being displayed on the CE device, the ad list may be truncated to only the top three in the order, whereas when UI #20 is being displayed on the CE device, all four ads in the list may be displayed.

In any case, it may now be appreciated that ads are presented to a first model of CE device using a first order while ads are presented to a second model of CE device using a second order, with the priorities depending on the model of CE device.

FIG. 3 shows logic that a CE device according to present principles may employ. Commencing at block 54, the CE device obtains the APIs whose functionalities are described below, either at manufacturing time or Subsequently via, e.g., Internet download. At block 56 an API, referred to herein as GetAdListO API, is executed to obtain from the gateway server 34 the prioritized list appertaining to the CE device executing the API by sending a call for the list to the server. In accordance with discussion above, part of the call may include the model number of the CE device, its identification, e.g., media access control (MAC) address, and the UI application currently being presented on the display, which is uploaded at block 58. Furthermore, if desired at block 60 information pertaining to any content currently being presented on the CE device may be uploaded, e.g., the channel number currently tuned to by the CE device and/or the title of content currently being displayed.

In accordance with the above principles, the gateway server 34, using the model number of the CE device and if desired the current UI application and currently viewed content information, returns to the CE device a list of prioritized ads based thereon, which is received by the CE device at block 62 and presented by the CE device on its display, e.g., the display 28.

Thus, GetAdListO is called from the client CE device and requests the gateway server 34 to return the current prioritized list of advertisements available for the device. Parameters uploaded by the API may include the device model, MAC address and UI application, allowing the ad list response to be customized for any CE device and UI screen. Furthermore, currently tuned channel, program name, etc., optionally may be included to aid in arranging the ad list returned to the CE device.

The response to the request from the server 34 may be in extensible markup language (XML) and includes a list of assets describing one or more advertisements. Included in the response may be uniform resource locators (URLs) for static ad content or URLs directing the CE device to the ad servers 44 for real time dynamic ad content.

Now referring to FIG. 4, the list received by the CE device in FIG. 3 is presented at block 64 on the display of the CE device. When a user of the device selects an item from the list at block 66 by, e.g., clicking on the item, an API referred to herein as GetAd( ) is executed at block 68 to obtain the full ad corresponding to the selected item. The ad is received by the CE device at block 70 along with, if desired, client action/auditing URLs which upload the actions as audit reports at block 72 to the URLs specified in the auditing information downloaded with the ad.

In an example implementation, GetAd( ) thus requests the active advertisement content available for the CE device and is called once for each dynamic ad specified in the ad list. The XML response from the gateway server 34 may include ad banner URLs, client actions, and impression/clickthrough auditing URIs. Actions taken by the client software when selecting an ad banner can vary from device to device. For TV devices these may include the following:

Tuning, timer setting, or recording
Launching Internet video playback
Jumping to a premium Internet video purchase page
  Launching a web browser with a URL to retrieve more information about the recommended product or service
Launching another TV application For tracking ad impressions and click-thru, one or more audit URLs per ad banner can be specified.

FIG. 5 illustrates an example ad list 74 that may be presented on the display 28 of the CE device 12. As shown, only three ads are listed in an order from top to bottom in accordance with the order discussed above.

Returning briefly to FIG. 1, note that the ad content provided to a requesting CE device may come from the proxy server 42, which obtains the ads from the various ad servers 44, or directly from the ad servers 44. The proxy server 42 may translate standard web ads designed for a browser experience and deliver them to the client device via the same GetAd( ) method described above. Alternatively, the gateway server 34 may be used for this purpose.

While the particular UNIFIED ONSCREEN ADVERTISEMENT SYSTEM FOR CE DEVICES is herein shown and described in detail, it is to be understood that the subject matter which is encompassed by the present invention is limited only by the claims.

What is claimed is:

1. Consumer electronics (CE) device comprising:
   processor;
   computer readable storage medium bearing instructions executable by the processor to:
     send at least a model number of the CE device to a gateway server, the model number being a first model number;
     receive from the gateway server a list of advertisements, the list indicating an order of the advertisements for display, the order being based on the first model number of the CE device; and
     present the list on the CE device according to the order, the CE device being a first CE device, such that the first CE device presents a first ad according to a first location in the order that is different from a location that the first ad is presented in accordance with an order of ads presented by a second CE device having a second model number different from the first model number.

2. The CE device of claim 1, wherein the processor sends to the gateway server an identification of a user interface (UI) currently invoked by the processor for presentation of the UI on a display of the CE device, the order being further based on the identification of the UI.

3. The CE device of claim 1, wherein the processor sends to the gateway server an identification of a TV channel currently being displayed by the CE device, the order being further based on the identification of the TV channel.

4. The CE device of claim 1, wherein the processor sends to the gateway server a title of an audio video content currently being displayed by the CE device, the order being further based on the title of the audio video content.

5. The CE device of claim 1, wherein the processor further sends an address of the CE device to the gateway server to obtain the list.

6. The CE device of claim 1, wherein the processor responsive to a user of the CE device selecting an item from the list executes an application programming interface (API) to obtain a full ad corresponding to the selected item.

7. The CE device of claim 6, wherein the full ad is received by the CE device along with client action/auditing URLs which upload subsequent user actions on the CE device as audit reports to the URLs.

8. Method comprising:
   receiving, by a computer, first and second model information of respective first and second consumer electronics (CE) devices, the first CE device not being the same model as the second CE device;
   associating by the computer a first list of advertisements (ads) with the first model information, the first list of ads having a first order among the ads on the first list, the first order being based on a model of the first CE device and defining a first priority in which ads on the first list are presented on the first CE device, the first order including a first ad located in a first position in the first order; and
   associating by the computer a second list of ads with the second model information, the second list of ads having a second order among the ads on the second list, the second order being based on a model of the second CE device and defining a second priority in which ads on the second list are presented on the second CE device, the second order including the first ad located in a second position in the second order, the second position in the second order being different than the first position such that the first ad appears lower in the second order than the first ad appears in the first order.

9. The method of claim 8, further comprising deriving the priorities based at least in part on TV channels.

10. The method of claim 8, further comprising deriving the priorities based at least in part on content titles.

11. The method of claim 8, further comprising deriving the priorities based at least in part on user interfaces (UI) configured for being presented on displays of CE devices.

12. The method of claim 8, further comprising sending the first list of ads to the first CE device and the second list of ads to the second CE device.

13. Server comprising:
   processor;
   computer readable storage medium bearing instructions executable by the processor to:

receive from a first consumer electronics (CE) device at least a first model identification of the first CE device;

using the first model identification establish for advertisements (ads) a first order that is based at least in part on the first model identification, wherein a first ad is associated in a first position of the first order;

send ads to the first CE device for presentation thereof by the first CE device according to the first order;

receive from a second CE device at least a second model identification of the second CE device, the second model identification being different from the first model identification;

using the second model identification, establish for ads a second order that is based at least in part by the second model identification, wherein the first ad is associated in a second position of the second order, the first position being different from the second position; and send ads to the second CE device for presentation thereof by the second CE device according to the second order.

14. The server of claim 13, wherein the processor establishes the order at least in part on a user interface (UI) identification received from the CE device, the UI identification representing a UI presentable on a display of the CE device.

15. The server of claim 13, wherein the processor establishes the order at least in part on an identification of a TV channel received from the CE device.

16. The server of claim 13, wherein the processor establishes the order at least in part on a title of an audio video content received from the CE device.

17. The server of claim 13, wherein the processor further receive from the CE device an address of the CE device.

18. The server of claim 13, wherein a server responsive to an indication from the CE device of a user of the CE device selecting an item from a list of ads sends a full ad corresponding to the selected item to the CE device.

19. The server of claim 18, wherein the server sends along with the full ad client action/auditing URLs which upload subsequent user actions on the CE device as audit reports to the URLs.

* * * * *